(12) United States Patent
Koch

(10) Patent No.: US 9,137,050 B2
(45) Date of Patent: Sep. 15, 2015

(54) DEMAND RESPONSE SYSTEM INCORPORATING A GRAPHICAL PROCESSING UNIT

(75) Inventor: Edward Koch, San Rafael, CA (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 13/299,716

(22) Filed: Nov. 18, 2011

(65) Prior Publication Data

US 2012/0066686 A1 Mar. 15, 2012

Related U.S. Application Data

(63) Continuation-in-part of application No. 13/019,943, filed on Feb. 2, 2011, now Pat. No. 8,782,190, and a continuation-in-part of application No. 12/834,841, filed on Jul. 12, 2010, now Pat. No. 8,671,167.

(60) Provisional application No. 61/301,123, filed on Feb. 3, 2010, provisional application No. 61/271,084, filed on Jul. 17, 2009.

(51) Int. Cl.
*G06F 9/46* (2006.01)
*G09G 5/39* (2006.01)
*H04L 12/64* (2006.01)
(Continued)

(52) U.S. Cl.
CPC .......... *H04L 12/6418* (2013.01); *G06F 9/5027* (2013.01); *G06F 9/5038* (2013.01); *G06Q 10/06* (2013.01); *G06T 1/00* (2013.01); *G09G 5/363* (2013.01)

(58) Field of Classification Search
CPC .............................. G06F 9/5038; G09G 5/363

USPC ........................................... 718/104; 345/531
See application file for complete search history.

(56) References Cited

U.S. PATENT DOCUMENTS

| 4,110,827 A | 8/1978 | Shavit |
| 4,130,874 A | 12/1978 | Pai |

(Continued)

FOREIGN PATENT DOCUMENTS

| WO | WO 2005033964 | 4/2005 |
| WO | WO 2008027455 | 3/2008 |

(Continued)

OTHER PUBLICATIONS

U.S. Appl. No. 12/895,640, filed Sep. 30, 2010.

(Continued)

*Primary Examiner* — Camquy Truong
(74) *Attorney, Agent, or Firm* — Seager Tufte & Wickhem LLP

(57) ABSTRACT

A system and approach for utilizing a graphical processing unit in a demand response program. A demand response server may have numerous demand response resources connected to it. The server may have a main processor and an associated memory, and a graphic processing unit connected to the main processor and memory. The graphic processing unit may have numerous cores which incorporate processing units and associated memories. The cores may concurrently process demand response information and rules of the numerous resources, respectively, and provide signal values to the main processor. The main processor may the provide demand response signals based at least partially on the signal values, to each of the respective demand response resources.

11 Claims, 12 Drawing Sheets

(51) Int. Cl.
  *G06F 9/50* (2006.01)
  *G06T 1/00* (2006.01)
  *G09G 5/36* (2006.01)
  *G06Q 10/06* (2012.01)

(56) References Cited

U.S. PATENT DOCUMENTS

| | | |
|---|---|---|
| 4,153,936 A | 5/1979 | Schmitz et al. |
| 4,419,667 A | 12/1983 | Gurr et al. |
| 4,850,010 A | 7/1989 | Stanbury et al. |
| 4,937,760 A | 6/1990 | Beitel et al. |
| 5,341,142 A | 8/1994 | Reis et al. |
| 5,500,561 A | 3/1996 | Wilhelm |
| 5,566,084 A | 10/1996 | Cmar |
| 5,572,438 A | 11/1996 | Ehlers et al. |
| 5,598,349 A | 1/1997 | Elliason et al. |
| 5,719,854 A | 2/1998 | Choudhury et al. |
| 5,822,553 A | 10/1998 | Gifford et al. |
| 5,892,758 A | 4/1999 | Argyroudis |
| 6,026,375 A | 2/2000 | Hall et al. |
| 6,195,367 B1 | 2/2001 | Jakobik et al. |
| 6,209,018 B1 | 3/2001 | Ben-shachar et al. |
| 6,252,950 B1 | 6/2001 | Duty et al. |
| 6,259,723 B1 | 7/2001 | Miyashita |
| 6,278,717 B1 | 8/2001 | Arsenault et al. |
| 6,289,384 B1 | 9/2001 | Whipple et al. |
| 6,366,926 B1 | 4/2002 | Pohlmann et al. |
| 6,446,136 B1 | 9/2002 | Pohlmann et al. |
| 6,519,509 B1 | 2/2003 | Nierlich et al. |
| 6,529,723 B1 | 3/2003 | Bentley |
| 6,535,817 B1 | 3/2003 | Krishnamurti et al. |
| 6,566,926 B1 | 5/2003 | Patterson |
| 6,574,581 B1 | 6/2003 | Bohrer et al. |
| 6,832,249 B2 | 12/2004 | Ciscon et al. |
| 6,857,022 B1 | 2/2005 | Scanlan |
| 6,865,685 B2 | 3/2005 | Hammond et al. |
| 6,985,087 B2 | 1/2006 | Soliman |
| 7,010,700 B1 | 3/2006 | Foss et al. |
| 7,016,784 B2 | 3/2006 | Allen et al. |
| 7,039,532 B2 | 5/2006 | Hunter |
| 7,069,309 B1 | 6/2006 | Dodrill et al. |
| 7,183,910 B2 | 2/2007 | Alvarez et al. |
| 7,260,616 B1 | 8/2007 | Cook |
| 7,333,880 B2 | 2/2008 | Brewster et al. |
| 7,337,237 B2 | 2/2008 | Salahshoor et al. |
| 7,346,467 B2 | 3/2008 | Bohrer et al. |
| 7,392,115 B2 | 6/2008 | Schindler |
| 7,401,086 B2 | 7/2008 | Chorafakis et al. |
| 7,528,503 B2 | 5/2009 | Rognli et al. |
| 7,565,227 B2 | 7/2009 | Richard et al. |
| 7,590,746 B2 | 9/2009 | Slater et al. |
| 7,650,289 B2 | 1/2010 | Cooper et al. |
| 7,676,657 B2 | 3/2010 | Lindholm et al. |
| 7,702,424 B2 | 4/2010 | Cannon et al. |
| 7,715,951 B2 | 5/2010 | Forbes, Jr. et al. |
| 7,742,953 B2 | 6/2010 | King et al. |
| 7,775,191 B2 | 8/2010 | Hou |
| 7,778,738 B2 | 8/2010 | Taft |
| 7,797,009 B2 | 9/2010 | Kiiskila et al. |
| 7,806,845 B2 | 10/2010 | Arm et al. |
| 7,845,576 B2 | 12/2010 | Siddaramanna et al. |
| 7,865,252 B2 | 1/2011 | Clayton |
| 7,873,441 B2 | 1/2011 | Synesiou et al. |
| 7,885,718 B2 | 2/2011 | Yano et al. |
| 7,886,166 B2 | 2/2011 | Shnekendorf et al. |
| 7,925,384 B2 | 4/2011 | Huizenga |
| 7,941,528 B2 | 5/2011 | Hicks, III et al. |
| 7,954,726 B2 | 6/2011 | Siddaramanna et al. |
| 7,958,229 B2 | 6/2011 | Conway |
| 8,023,410 B2 | 9/2011 | O'Neill |
| 8,073,558 B2 | 12/2011 | Koch et al. |
| 8,091,794 B2 | 1/2012 | Siddaramanna et al. |
| 8,140,658 B1 | 3/2012 | Gelvin et al. |
| 8,143,811 B2 | 3/2012 | Shloush et al. |
| 8,163,276 B2 | 4/2012 | Hedrick et al. |
| 8,170,774 B2 | 5/2012 | Forte et al. |
| 8,183,995 B2 | 5/2012 | Wang et al. |
| 8,199,773 B2 | 6/2012 | Aubin et al. |
| 8,232,745 B2 | 7/2012 | Chemel et al. |
| 8,234,017 B2 | 7/2012 | Ahn |
| 8,234,876 B2 | 8/2012 | Parsonnet et al. |
| 8,260,468 B2 | 9/2012 | Ippolito et al. |
| 8,260,469 B2 | 9/2012 | Gregory et al. |
| 8,260,650 B2 | 9/2012 | Miller |
| 8,291,243 B2 | 10/2012 | Castelli et al. |
| 8,295,989 B2 | 10/2012 | Rettger et al. |
| 8,312,299 B2 | 11/2012 | Tremel et al. |
| 8,321,302 B2 | 11/2012 | Bauer et al. |
| 8,321,950 B2 | 11/2012 | Oran |
| 8,327,024 B2 | 12/2012 | Pattison et al. |
| 8,352,094 B2 | 1/2013 | Johnson et al. |
| 8,373,547 B2 | 2/2013 | Benya et al. |
| 8,386,086 B2 | 2/2013 | Roux et al. |
| 8,406,937 B2 | 3/2013 | Verfuerth et al. |
| 8,417,391 B1 | 4/2013 | Rombouts et al. |
| 8,443,355 B2 | 5/2013 | Wiese et al. |
| 8,621,097 B2 | 12/2013 | Venkatakrishnan et al. |
| 2003/0016237 A1 | 1/2003 | Hickey |
| 2003/0033230 A1 | 2/2003 | Mccall |
| 2003/0233064 A1 | 12/2003 | Arm et al. |
| 2004/0034484 A1 | 2/2004 | Solomita, Jr. et al. |
| 2004/0137897 A1 | 7/2004 | Teixeira |
| 2004/0203649 A1 | 10/2004 | Cashiola |
| 2005/0027636 A1 | 2/2005 | Gilbert et al. |
| 2005/0152694 A1 | 7/2005 | Chown |
| 2005/0172304 A1 | 8/2005 | Tavares et al. |
| 2005/0194456 A1 | 9/2005 | Tessier et al. |
| 2005/0229220 A1 | 10/2005 | Fisher et al. |
| 2005/0262026 A1 | 11/2005 | Watkins |
| 2007/0005195 A1 | 1/2007 | Pasquale et al. |
| 2007/0055999 A1 | 3/2007 | Radom et al. |
| 2007/0222295 A1 | 9/2007 | Wareham et al. |
| 2008/0011864 A1 | 1/2008 | Tessier et al. |
| 2008/0046715 A1 | 2/2008 | Balazs et al. |
| 2008/0167931 A1 | 7/2008 | Gerstemeier et al. |
| 2008/0177678 A1 | 7/2008 | Di Martini et al. |
| 2008/0262848 A1 | 10/2008 | Shienbrood et al. |
| 2009/0046625 A1 | 2/2009 | Diener et al. |
| 2009/0092062 A1 | 4/2009 | Koch et al. |
| 2009/0160865 A1* | 6/2009 | Grossman ............... 345/502 |
| 2009/0187499 A1 | 7/2009 | Mulder et al. |
| 2009/0198384 A1 | 8/2009 | Ahn |
| 2009/0204977 A1 | 8/2009 | Tavares et al. |
| 2009/0249090 A1 | 10/2009 | Schmitz et al. |
| 2009/0271255 A1 | 10/2009 | Utter et al. |
| 2009/0281674 A1 | 11/2009 | Taft |
| 2009/0295594 A1 | 12/2009 | Yoon |
| 2009/0297488 A1 | 12/2009 | Fraser et al. |
| 2009/0313083 A1 | 12/2009 | Dillon et al. |
| 2009/0319090 A1 | 12/2009 | Dillon et al. |
| 2009/0326726 A1 | 12/2009 | Ippolito et al. |
| 2010/0057480 A1 | 3/2010 | Arfin et al. |
| 2010/0076615 A1 | 3/2010 | Daniel et al. |
| 2010/0076835 A1 | 3/2010 | Silverman |
| 2010/0088261 A1 | 4/2010 | Montalvo |
| 2010/0106342 A1 | 4/2010 | Ko et al. |
| 2010/0106543 A1 | 4/2010 | Marti |
| 2010/0114340 A1 | 5/2010 | Huizenga et al. |
| 2010/0138363 A1 | 6/2010 | Batterberry et al. |
| 2010/0146501 A1* | 6/2010 | Wyatt et al. ............... 718/1 |
| 2010/0168924 A1 | 7/2010 | Tessier et al. |
| 2010/0274377 A1 | 10/2010 | Kaufman et al. |
| 2010/0283606 A1 | 11/2010 | Tsypin et al. |
| 2010/0324962 A1 | 12/2010 | Nesler et al. |
| 2011/0016200 A1 | 1/2011 | Koch |
| 2011/0040550 A1 | 2/2011 | Graber et al. |
| 2011/0040666 A1 | 2/2011 | Crabtree et al. |
| 2011/0046805 A1 | 2/2011 | Bedros et al. |
| 2011/0057936 A1* | 3/2011 | Gotwalt et al. ........... 345/504 |
| 2011/0093493 A1 | 4/2011 | Nair et al. |
| 2011/0113068 A1 | 5/2011 | Ouyang |
| 2011/0125542 A1 | 5/2011 | Koch |
| 2011/0172836 A1 | 7/2011 | Boss et al. |
| 2011/0172838 A1 | 7/2011 | Pai et al. |

(56) References Cited

U.S. PATENT DOCUMENTS

| | | |
|---|---|---|
| 2011/0196539 A1 | 8/2011 | Nair et al. |
| 2011/0196546 A1 | 8/2011 | Muller et al. |
| 2011/0199209 A1 | 8/2011 | Siddaramanna et al. |
| 2011/0212700 A1 | 9/2011 | Petite |
| 2011/0231320 A1 | 9/2011 | Irving |
| 2011/0258049 A1 | 10/2011 | Ramer et al. |
| 2011/0301774 A1 | 12/2011 | Koch |
| 2012/0066686 A1 | 3/2012 | Koch |
| 2012/0093141 A1 | 4/2012 | Imes et al. |
| 2012/0101653 A1 | 4/2012 | Tran |
| 2012/0109399 A1 | 5/2012 | Tran |
| 2012/0136915 A1 | 5/2012 | Koch et al. |
| 2012/0173030 A1 | 7/2012 | Taft |
| 2012/0197456 A1 | 8/2012 | Walter et al. |
| 2012/0197457 A1 | 8/2012 | Walter et al. |
| 2012/0197458 A1 | 8/2012 | Walter et al. |
| 2012/0245968 A1 | 9/2012 | Beaulieu et al. |
| 2012/0271473 A1 | 10/2012 | Koch |
| 2012/0277920 A1 | 11/2012 | Koch |
| 2013/0035992 A1 | 2/2013 | Silverman |
| 2013/0047010 A1 | 2/2013 | Massey et al. |
| 2013/0079931 A1 | 3/2013 | Wanchoo et al. |
| 2014/0122181 A1 | 5/2014 | Fisera et al. |
| 2014/0278687 A1 | 9/2014 | McConky et al. |
| 2015/0018985 A1 | 1/2015 | Koch et al. |
| 2015/0019032 A1 | 1/2015 | Koch et al. |
| 2015/0019037 A1 | 1/2015 | Koch |
| 2015/0019275 A1 | 1/2015 | Koch |

FOREIGN PATENT DOCUMENTS

| | | |
|---|---|---|
| WO | WO 2008027457 | 3/2008 |
| WO | WO 2009/006133 | 1/2009 |
| WO | WO 2009/020606 | 2/2009 |
| WO | WO 2009/023230 | 2/2009 |
| WO | WO 2009/027617 | 3/2009 |
| WO | WO 2009/085610 | 7/2009 |
| WO | WO 2011/065007 | 6/2011 |
| WO | WO 2013/025565 | 2/2013 |
| WO | WO 2013/055551 | 4/2013 |

OTHER PUBLICATIONS

U.S. Appl. No. 13/016,181, filed Jan. 28, 2011.
U.S. Appl. No. 13/016,265, filed Jan. 28, 2011.
U.S. Appl. No. 13/016,306, filed Jan. 28, 2011.
U.S. Appl. No. 13/272,086, filed Oct. 12, 2011.
U.S. Appl. No. 13/298,706, filed Nov. 17, 2011.
Coughlin et al., "Estimating Demand Response Load Impacts: Evaluation of Baseline Load Models for Non-Residential Buildings in California," Lawrence Berkeley National Laboratory, Resort No. LBNL-63728, 33 pages, Jan. 2008.
Cruz, "Tutorial on GPU Computing with an Introduction to CUDA," 37 pages, prior to Nov. 17, 2011.
Honeywell, "Automated Demand Response—Southern California Program," 2 pages, printed Aug. 1, 2011.
Honeywell, "The Perfect Response to Peak Events," 4 pages, Nov. 2010.
en.wikipedia.org/wiki/Demand_response, "Demand Response," 10 pages, printed Feb. 3, 2012.
//buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response for Small Commercial Buildings," Lawrence Berkeley National Laboratory, Report No. LBNL-2195E, 104 pages, Jul. 2009.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkeley National Laboratory, Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, akuacom.com/assets/pdf/ASHRAE_2008_Ed_Koch.pdf, 18 pages, prior to Nov. 17, 2011.
Piette et al., "Automated Critical Peak Pricing Field Tests: 2006 Pilot Program Description and Results," Berkeley National Laboratory, Report No. LBNL-62218, 67 pages, Aug. 2007.
Piette et al., "Automated Critical Peak Pricing Field Tests: Program Description and Results," Lawrence Berkeley National Laboratory, Report No. LBNL-59351, Apr. 2006.
Piette et al., "Design and Implementation of an Open, Interoperable Automated Demand Response Infrastructure," Berkeley National Laboratory, Report No. LBNL-63665, 6 pages, Oct. 2007.
Piette et al., "Findings From the 2004 Fully Automated Demand Response Tests in Large Facilities," Lawrence Berkeley National Laboratory, Report No. LBNL-58178, 197 pages, Sep. 2005.
Piette et al., "Linking Continuous Energy Management and Open Automated Demand Response," Lawrence Berkeley National Laboratory, Report No. LBNL-1361E, 9 pages, Nov. 2008.
Piette et al. "Open Automated Demand Response Communications Specification," Version 1.0, CEC-500-2009-063, 214 pages, Apr. 2009.
Piette et al., "Participation through Automation: Fully Automated Critical Peak Pricing in Commercial Buildings," Berkeley National Laboratory, Report No. LBNL-60614, 14 pages, Aug. 13-18, 2006.
Watson et al., "Machine to Machine (M2M) Technology in Demand Responsive Commercial Buildings," Berkeley National Laboratory, Report No. LBNL-55087, 18 pages, Aug. 2004.
Yin et al., "Auto-DR and Pre-Cooling of Buildings at Tri-City Corporate Center," Lawrence Berkeley National Laboratory, Report No. LBNL-3348, 140 pages, Nov. 2008.
U.S. Appl. No. 13/621,195, filed Sep. 15, 2012.
Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.
European Search Report for Related Application No. EP 12169650.4, Dated Nov. 22, 2012.
Holmberg, "Facility Interface to the Smart Grid," National Institute of Standards and Technology, 7 pages, printed 2012.
"Smart Demand Response: A Discussion Paper," Energy Networks Association, energyuk, 44 pages, prior to Nov. 29, 2012.
International Search Report for PCT ApplicationSerial No. pct/us2012/058537, International Filing Date Oct. 3, 2012.
U.S. Appl. No. 13/689,551, filed Nov. 29, 2012.
naesb.org/pdf3/dsmee012308213.doc, "Demand Response Measurement and Verification Literature Review," 29 pages, created Jan. 14, 2008, modified Dec. 18, 2012.
Hunt, "Automated Demand Response System and Advanced End-Use Services Platform," Optimal Technologies, 31, pages, Sep. 24, 2004.
Olson, "New Approaches in Automating and Optimizing Demand Response to Solve Peak Load Management Problems," Building IQ brochure, 8 pages, 2011.
Schisler et al., "The Role of Demand Response in Ancillary Services Markets," IEEE, 3 pages, 2008.
Violette et al., "DRR Valuation and Market Analysis vol. II: Assessing the DRR Benefits and Costs," Summit Blue Consulting, 112 pages, Jan. 6, 2006.
Zaidi et al., "Load Recognition for Automated Demand Response in Microgrids," IEEE, pp. 2436-2439, 2010.
U.S. Appl. No. 14/526,193, filed Oct. 28, 2014.

(56) References Cited

OTHER PUBLICATIONS

Autogrid, "Austin Energy and AutoGrid Systems Collaborate on Standards-Based Automated Demand Response to Usher in a New Era of Retail Choice for the Demand Response Market," 5 pages, Feb. 26, 2013.
U.S. Appl. No. 14/056,902, filed Oct. 17, 2013.
U.S. Appl. No. 14/224,744, filed Mar. 25, 2014.
"Executive Summary," 1 page, prior to Sep. 2007.
Federal Energy Regulatory Commission (FERC), "Assessment of Demand Response & Advanced Metering," 92 pages, Sep. 2007.
http://www.akuacom.com/solutions/index.html, "Akuacom—Automated Demand Response," 2 pages, printed Feb. 3, 2012.
Santacana et al., "Getting Smart, With a Clearer Vision of Intelligent Grid, Control Emerges from Chaos," IEEE Power and Energy Magazine, pp. 41-48, Mar./Apr. 2010.

* cited by examiner

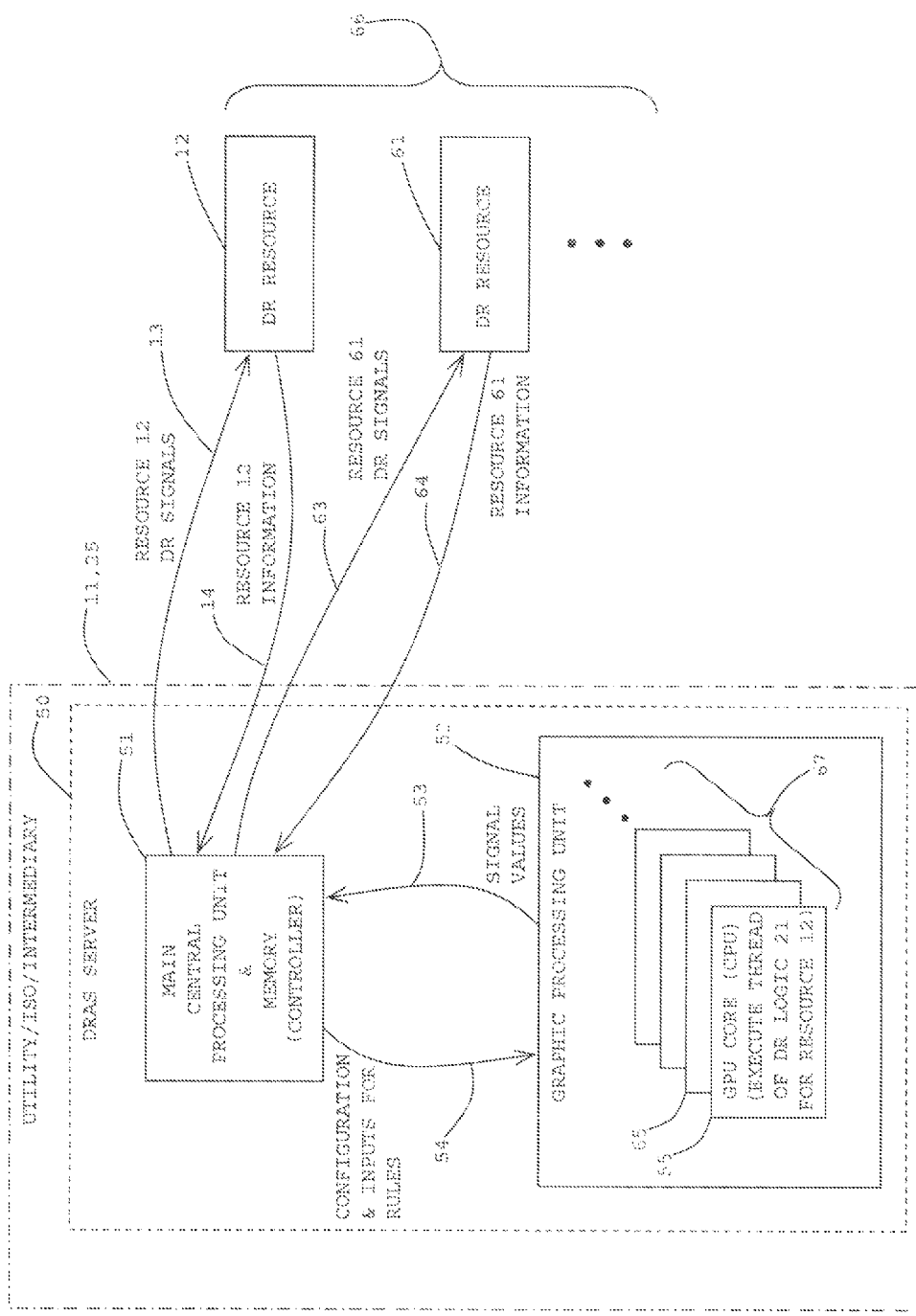

DEMAND RESPONSE SYSTEM INCORPORATING A GRAPHICAL PROCESSING UNIT

This application is a continuation-in-part of U.S. patent application Ser. No. 13/019,943, now U.S. Pat. No. 8,782,190 filed Feb. 2, 2011, entitled "A Demand Response Management System", which claims the benefit of U.S. Provisional Patent Application No. 61/301,123, filed Feb. 3, 2010, and entitled "Demand Response Management System". U.S. patent application Ser. No. 13/019,943, now U.S. Pat. No. 8,782,190 filed Feb. 2, 2011, is hereby incorporated by reference. U.S. Provisional Patent Application No. 61/301,123, filed Feb. 3, 2010, is hereby incorporated by reference.

This application is a continuation-in-part of U.S. patent application Ser. No. 13/019,943, now U.S. Pat. No. 8,782, 190, filed Feb. 2, 2011, entitled "A Demand Response Management System", which is a continuation-in-part of U.S. patent application Ser. No. 12/834,841, filed Jul. 12, 2010 U.S. Pat. No. 8,671,167, now and entitled "A System for Providing Demand Response Services", which claims the benefit of U.S. Provisional Patent Application No. 61/271, 084, filed Jul. 17, 2009. U.S. patent application Ser. No. 12/834,841, now U.S. Pat. No. 8,671,167, filed Jul. 12, 2010, is hereby incorporated by reference. U.S. Provisional Patent Application No. 1 61/271,084, filed Jul. 17, 2009, is hereby incorporated by reference.

BACKGROUND

The present disclosure pertains to utility resources and particularly to assessment and distribution of the resources. More particularly, the invention pertains to beneficial management and efficient processing involving large amounts of information pertaining to the resources and their loads with demand response systems.

SUMMARY

The disclosure reveals a system and approach for utilizing a graphical processing unit in a demand response program. A demand response server may have numerous demand response resources connected to it. The server may have a main processor and an associated memory, and a graphic processing unit connected to the main processor and memory. The graphic processing unit may have numerous cores which incorporate processing units and associated memories. The cores may concurrently process demand response information and rules of the numerous resources, respectively, and provide signal values to the main processor. The main processor may the provide demand response signals based at least partially on the signal values, to each of the respective demand response resources.

BRIEF DESCRIPTION OF THE DRAWING

FIGS. 2c and 2d are diagrams showing a relationship of a utility, independent system operator and/or intermediary to the server shown in the diagram of FIG. 2a;

DESCRIPTION the present disclosure deals with a use of graphical processing units to manage rules associated with participants in demand response programs. There may be an implementation of demand response (DR) logic within a demand response management system (DRMS). The system and associated software may be implemented and operated with one or more computers/controllers (controllers) and connections. The DRMS is a system that may be used by utilities and independent system operators (ISO's) to manage the operation of DR programs. A focus of the DRMS may be on the operational aspects of managing the selection, signaling and monitoring of the DR resources that are participating in DR programs. The DRMS may be specifically designed to manage the operations of automated DR programs. The DR logic components of the DRMS are noted herein.

Figure 1:
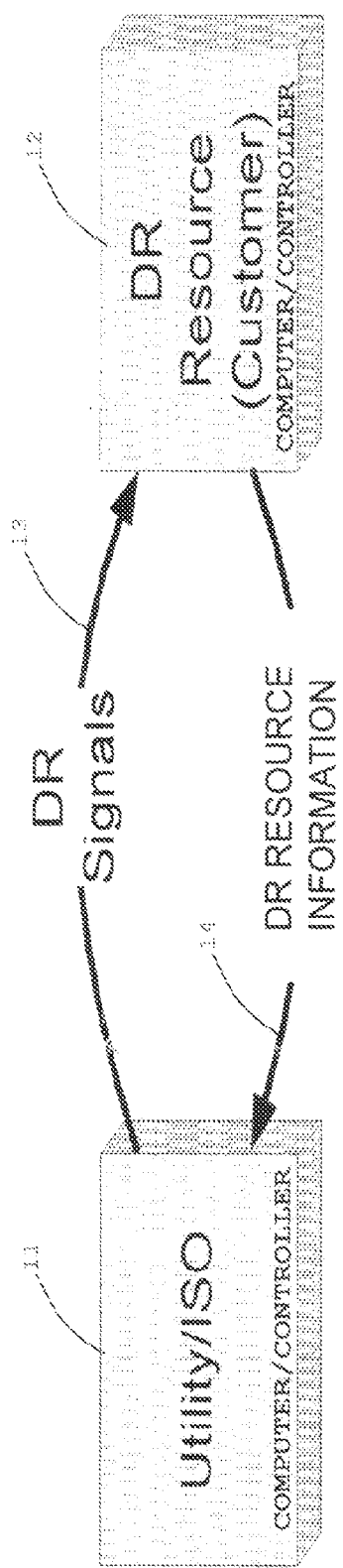
FIG. 1 is a diagram of an interaction between a utility and/or independent system operator and a demand response resource.

There may be various types of interactions that might occur between the utility/ISO and a DR resource as part of a DR program. FIG. 1 is a diagram of an interaction between a utility/ISO 11 and a DR resource (customer) 12. There may be DR signals 13 going from utility/ISO 11 to DR resource 12. There may be DR resource information (e.g., load measurement) signals 14 going from DR resource 12 to utility/ISO 11.

DR resource, customer, client, user, participant, and like terms, may be used interchangeably or distinct from one another, depending on a context of a pertinent portion of a description or a claim.

A description of DR signals 13 may be noted. At the highest level, there may virtually always be some sort of grid condition, be it economic or grid reliability in nature, which triggers a DR event that needs some sort of interaction between the utility/ISO 11 and its customers 12. This interaction may eventually trigger some sort of load control taking place at a customer's facility. The interaction between the utility/ISO 11 and the customer 12 may be mediated by a DR signal 13 that represents a communication between the utility/ISO 11 and the customer 12. It is the information contained within the DR signal 13 that may dictate where much of the decision making takes place in how the initial grid condition that triggered the DR event results in the eventual load control.

When implementing systems for managing an automated demand response (DR), there may be utility enterprise subsystems that are responsible for generating DR signals which are sent to participants of a DR program. These sub-systems may be referred to as demand response management systems (DRMS). There may be a number of functions that may be performed within the DRMS which are referred to as "DR logic". The DR logic may be a set of per participant rules which defines the content of the DR signals that are sent to each participant in the DR program. As the number of participants in a DR program grows, the ability for the DRMS to continuously execute each participant's DR logic may become a constraining factor in the scalability of the DRMS. What appears to be needed may be an efficient and low cost way to execute the DR logic for each participant so that the number of participants which can be serviced by a single server is as high as possible, which can in turn reduce the number of servers needed and lower the overall cost to deploy the DRMS system.

The present system may solve the aforementioned challenges by utilizing very low cost computing resources in a form of graphical processing units (GPU's). GPU's may be off-the-shelf peripherals that can be easily installed in an existing off-the-shelf server. GPU's may be specialized computing platforms that are primarily intended to perform high speed graphics processing by using large numbers of parallel CPU's on a single chip that allow large computing tasks to be done in parallel. While GPU's appear to have been originally designed for graphics processing, GPU's may be used in a wide range of general computing tasks that lend themselves to high degrees of parallelization. With the use of GPU's, a computationally intensive task on a single server may gain, for example, a 10 to 100 multiple increase in performance and throughput. Since the cost of GPU's appears low with respect to the servers themselves, it may therefore be possible to get huge increases in computational performance at a fraction of the cost of additional servers.

The use of GPU's may entail modeling the computation task as a set of operations that can be performed in parallel and then assigning an operation to each CPU in the GPU as a separate thread of execution. The GPU may effectively become a massively parallel computer. In the present system, there may be large numbers of participants, each with potentially its own set of DR logic rules. There may be little or no interdependence between or among the participants, and therefore this computation task can lend itself very well to parallel computing.

As discussed herein, the DR logic rules may take the form of simple rules such as for example:

If TIME>13:00 and TIME<16:00 and PRICE>0.10
then set the DR signals simple level to MODERATE.

Figure 9:
FIG. 9 is a diagram of a table being a way of representing quantities and/or rules allowing them to be easily edited for adjusting a demand response signal for a particular customer, client or participant, relative to a demand response event.

More examples of rules are shown in table 40 of FIG. 9.

Various fields in the DR signals for a specific participant may be associated with a simple set of rules. Each set of participant rules may be associated with a separate thread of execution in the GPU. The manner in which the GPU may be programmed to accomplish this is to use existing programming languages such as CUDA C (Compute Unified Device Architecture C) or OpenCL (Open Computing Language). Each of these programming languages may be specifically designed to utilize GPU's for parallel operations and may be supported with off-the-shelf programming tools.

It may be possible to set up the parallel execution threads in the GPU by normalizing virtually all of the participant rules so that they have the same form (i.e., can be expressed using the same set of subroutine codes), and then creating a separate thread for each participant that will execute the generic rules code. It may then be possible to define the exact nature of each set of the participant's rules with a set of parameters which are specific to each participant that can define the operations (i.e., the rules) to be performed by the generic code. In this way, each of the participant's rules may be expressed with a set of parameters which can be fed into the GPU so that they can virtually all be executed in parallel by the generic rules code that has been compiled into each of the GPU threads.

The input variables (such as TIME and PRICE, noted herein) may be input into the thread executions of the GPU as global variables that are common to virtually all of the threads. In addition, there may exist input variables that are specific to each participant and they can also be input to each of the threads on an as-needed basis.

The results of each thread execution may be specific values corresponding to the rules of each participant which may then be sent to each participant via a DR signal as described herein.

Figure 2A:
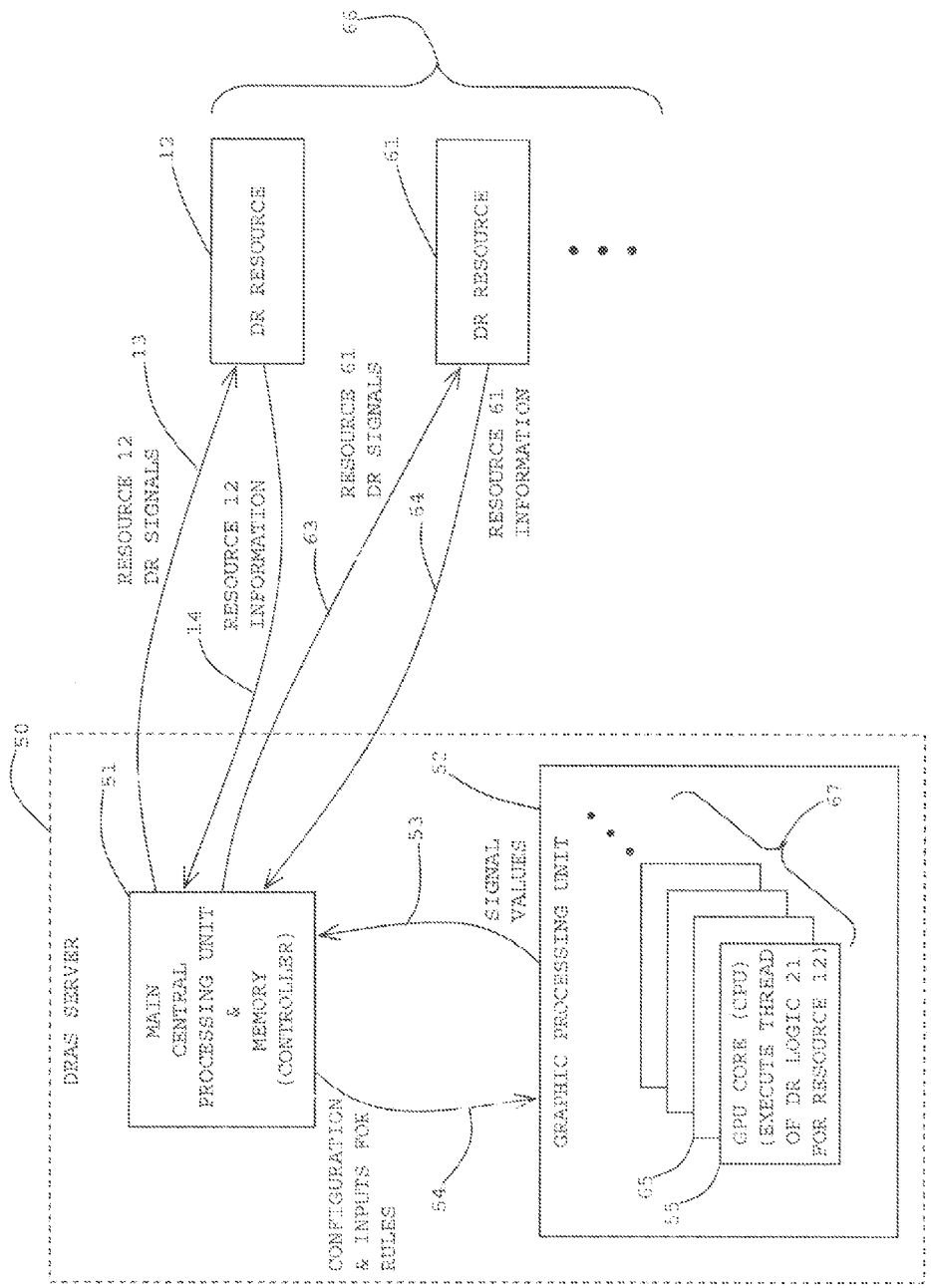
FIGS. 2a and 2b are diagrams of an interaction of a demand response customers or resources with a server and of a graphic processing unit.
Figure 2B:
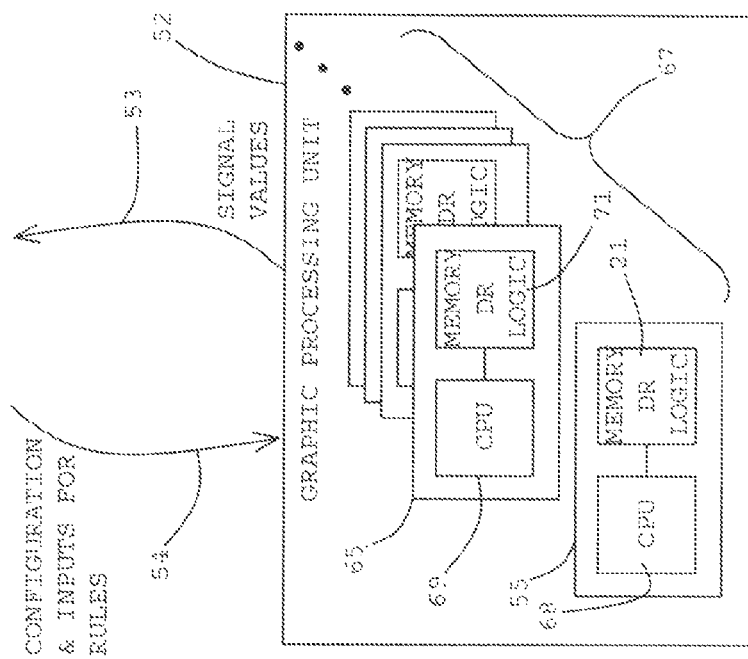

FIG. 2a is a diagram of an interaction layout of demand response customers or resources 66 with a "demand response automation server" 50 incorporating a graphic processing unit 52. Resource 12, resource 61 and other DR resources of a group 66 may interact with server 50. For two examples, resource information 14 from resource 12 and resource information 64 from resource 61 may be provided to a "main central processing unit (CPU) and memory" block 51 (controller 51). FIG. 2b is a diagram showing more detail of the graphic processing unit 52.

Resource information 14, 64 may be processed at block 51 and result in affecting "configuration and inputs for rules" 54 (information 54) being provided via a connection from block 51 to a graphic processing unit 52 for DR resources 12, 61 and other DR resources of group 66. There may be GPU cores (incorporating CPU's 68, 69) 55, 65 and other GPU cores of a group 67 of GPU cores for processing information from the DR resources via the connection for "configuration and inputs for rules" 54 (information 54). Core 55 may process information from DR resource 12, core 65 may process information for DR resource 61, and the remaining cores of the group 67 may process information for the remaining DR resources of group 66, respectively. The information may be processed in conjunction with a set of rules which may be DR logic 21, 71 provided to each GPU core 55, 65, respectively, for each of the DR resources 12, 61. DR logic 21, 71 and other DR logic for the other resources of group 66 may be located inside or outside the respective core and, in the latter case, be provided to the respective core from another location, such as for example the utility, when being executed. One or more other components may be present in the respective cores in lieu of or in addition to the DR logic.

Each core may provide execution of a thread. A thread may incorporate DR logic corresponding to a DR resource. For more than one DR resource, there may be more that one thread and execution of the threads may be done in parallel (e.g., simultaneous processing).

Outputs from the cores of group 67 may be signal values 53 which are conveyed to the main CPU and memory block 51 via a connection. Block 51 may process the signal values 53 into DR signals 13 for DR resource 12, DR signals 63 for DR resource 61, and DR signals for the other DR resources of the group 66. Again, DR resource 12 information 14, DR resource 61 information 64, and DR resource information from the other DR resources of group may go to the main CPU and memory block 51 of server 50 for processing at block 51 and GPU 52 as described herein. The parallel processing architecture of GPU 52 may provide the massive processing needed at times for the numerous DR resources at a reasonable speed and cost.

Figure 2C:
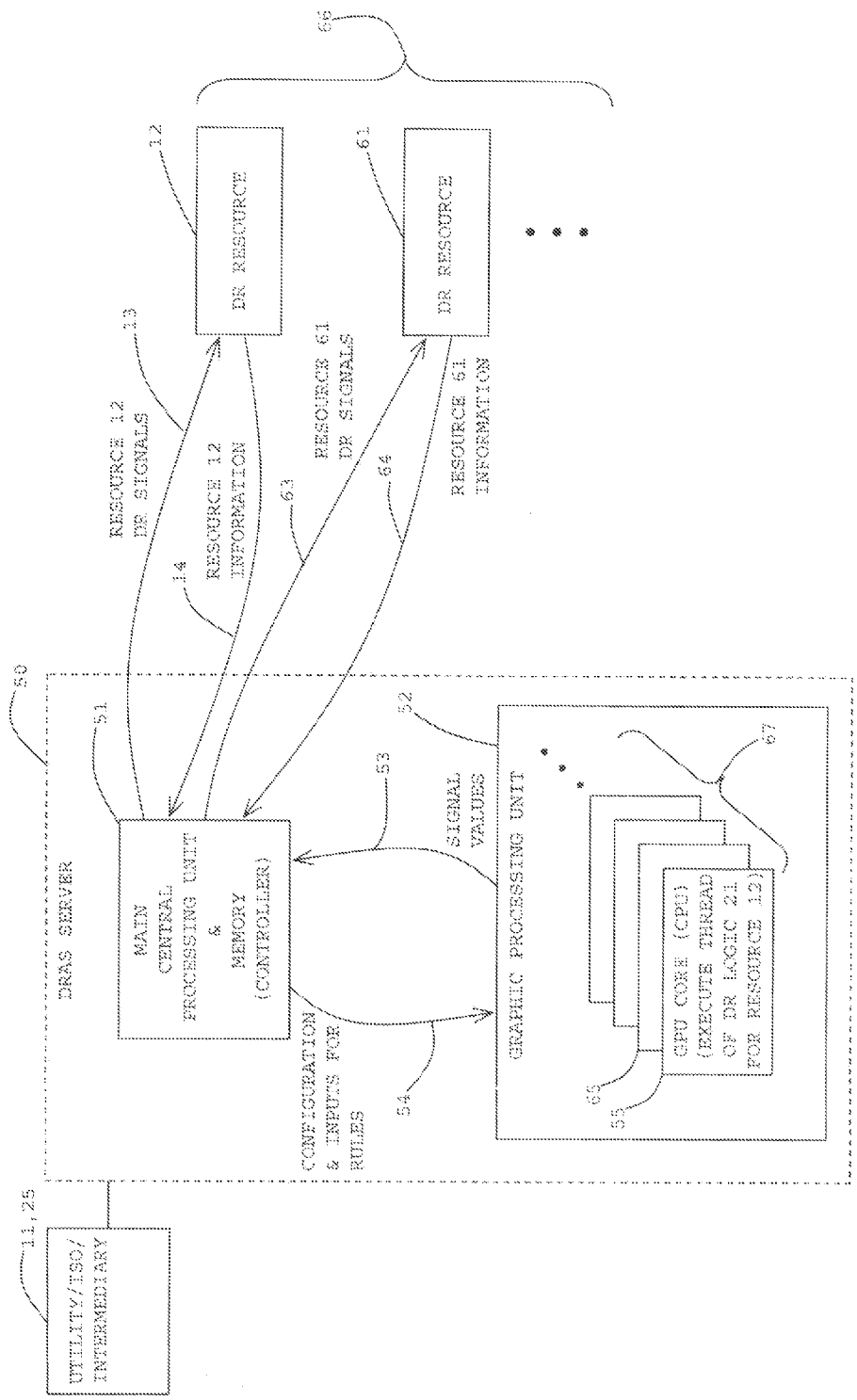

FIG. 2c is a diagram that shows that server 50 may be connected to a utility/ISO 11 or an intermediary 25. FIG. 2d is a diagram which shows that server 50 may be a part of a utility/ISO 11 or an intermediary 25.

Figure 3:
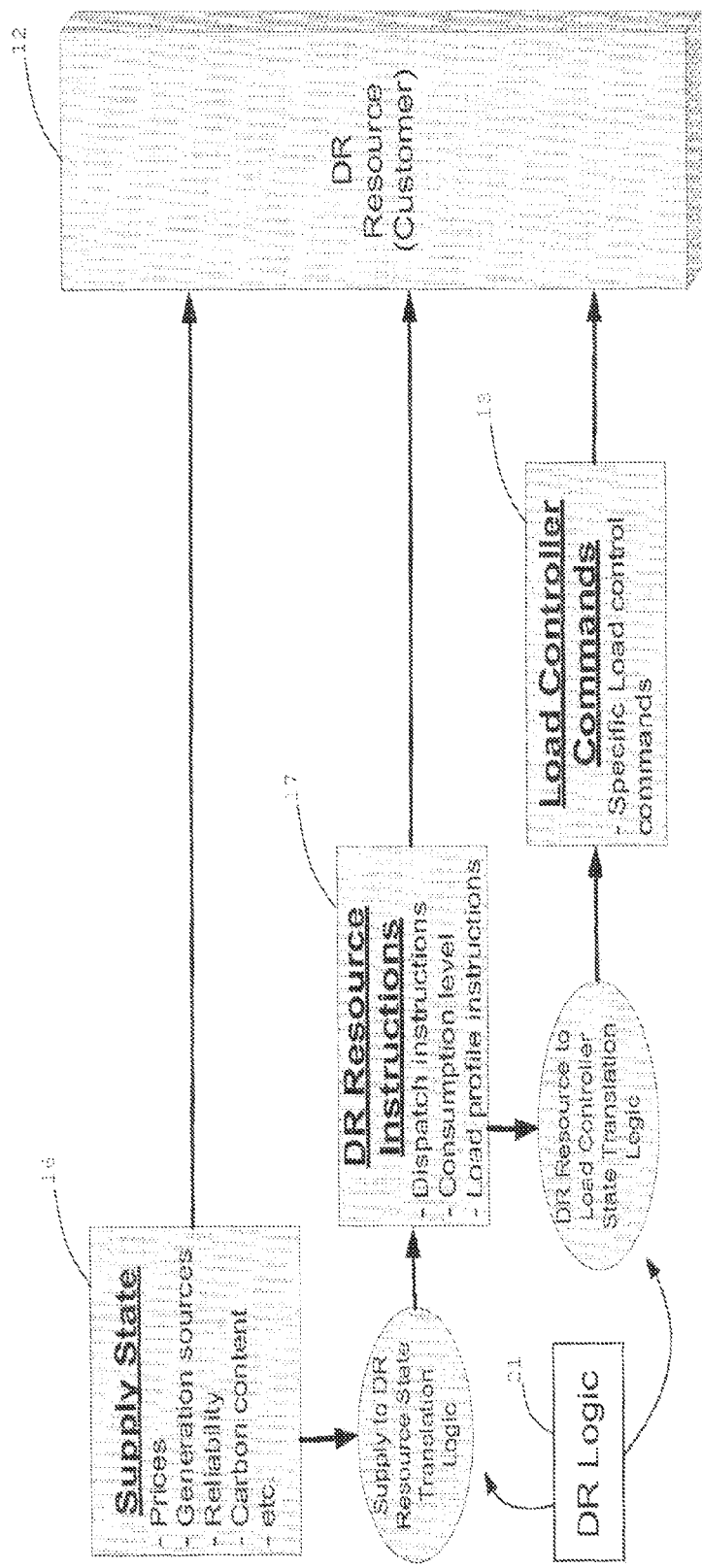
FIG. 3 is a diagram of a classification hierarchy of the types of demand response interactions and signals that may be used relative to a demand response resource.
Figure 4:
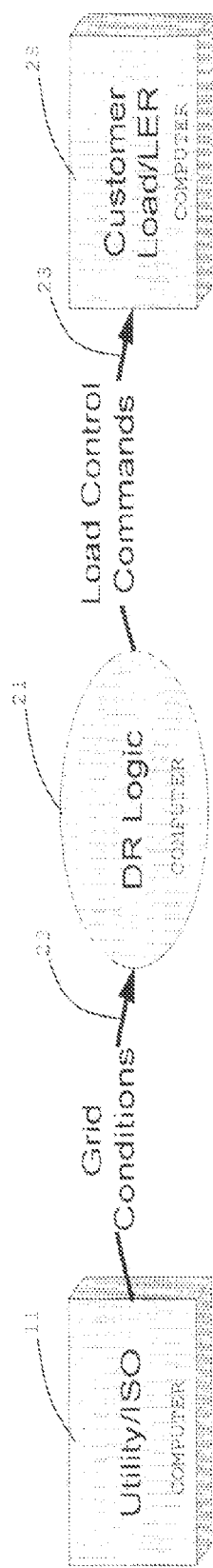
FIG. 4 is a diagram of how demand response logic may transform high level grid conditions into eventual load control commands.

There may be a classification hierarchy of the types of DR interactions and signals that may be used as illustrated by a diagram in FIG. 3. Three classes of interactions that may occur incorporate a supply state 16, DR resource instructions 17, and load controller commands 18.

A supply 16 state may refer to information about conditions concerning the supply of electricity that may affect DR resource's 12 load profile. The conditions may incorporate prices of electricity, sources of generation (e.g., hydro versus coal), carbon content, reliability of supply or grid conditions, and other conditions.

The nature of this information may be such that it does not necessarily include any specific instructions for how the load profile of the DR resource should change. Virtually all decisions as to what the desired load profile should be in response to the information within a DR signal 13 may be within the DR resource 12. A very typical example of this type of DR signal 13 may be real-time or dynamic electricity prices that may be sent to a DR resource 17.

DR resource instructions may refer to information that specifies what the load profile of a DR resource 12 should be as a result of receiving a DR signal 13. Examples of this information may incorporate specific consumption levels (which can be either up or down), dispatch instructions, and load profile specifications.

This type of information may be more specific than information of the supply state 16 in that it indicates what the load profile of DR resource 12 should be. The information does not necessarily indicate how individual loads of DR resource 12 should be controlled and thus the intelligence for determining how to control individual loads may be virtually all within DR resource 12. The information may be about load shifting or shedding, and the certainty or predictability of a load shape change.

Typical examples of such information may incorporate dispatch instructions that may be sent from an ISO 11 to an aggregator. Such dispatch instructions may often be in a form of an amount of load that DR resource 12 is expected to provide.

Load controller commands 18 may refer to specific load control commands sent to a controller of a load that specifies the state that the load should be in. Examples may incorporate existing DR programs such as AC cycling in which air conditioners within residences are turned on and off. This information may be used for DLC (direct load control).

DR logic 21 may support supply state 16 and the DR resource instructions 17. DR logic 21 may be a part of or provided by a computer/controller (computer) at a place where the logic 21 is situated. The computer may incorporate one or more inputs, a processor, a user interface with a keyboard and display, a memory, external connections such as an internet, one or more outputs, and so forth. The computer may be utilized with virtually all items in and pertinent to FIGS. 1-9.

Figure 5A:
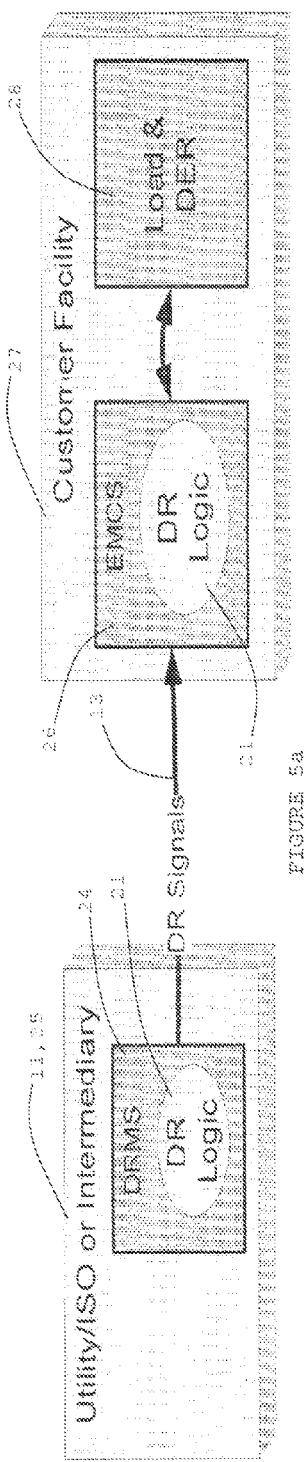
FIGS. 5a, 5b and 5c are diagrams illustrating cases where some or virtually all of demand response logic is implemented by a demand response management system which may reside within a utility and/or independent system operator or an intermediary entity.
Figure 5B:
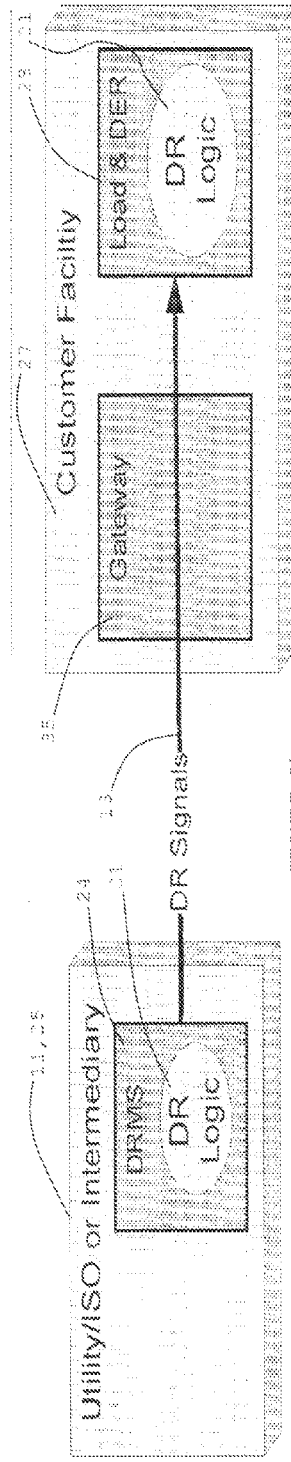
Figure 5C:
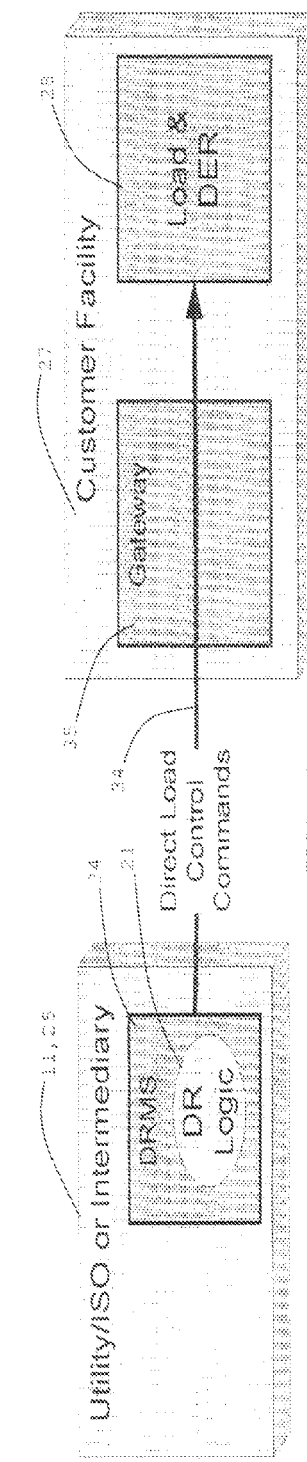

A specification for the DR logic 21 may be necessary to support load controller commands (direct load control). DR logic 21 may transform high level grid conditions 22 into eventual load control commands 23 as indicated a diagram of FIG. 4. DR logic 21, associated with a computer, may be instantiated within a single entity or may be distributed across different systems as entities. While there may be "use cases" where no DR logic 21 is implemented within an entity that interacts with the customer facility 27 (i.e., utility/ISO 11 or intermediary 25), one may note the use cases where at least some of the DR logic 21 is implemented by a DRMS 24 which resides within the utility/ISO 11 or an intermediary entity 25 as shown in FIGS. 5a-5c. A last use case of FIG. 5c in which virtually all of the DR logic 21 may be embedded within the utility/ISO 11 or intermediary entity 25 may be considered as providing direct load control (DLC) as indicated by commands 34 which go to load and DER 28 of customer facility 27 via gateway 35.

In FIG. 5a, a first use case shows a scenario wherein some of the DR logic 21 may reside within an energy management and control system (EMCS) 26 within a customer facility 27. EMCS 26 may be an actual device or a software module running inside a larger system with a computer such as customer facility 27. Upon receiving a DR signal 13, EMCS 26 may be responsible for processing the information within the DR signal 13 into some sort of facility wide load profile objectives and/or load control commands. There may be an interaction between EMCS 26 and load and DER 28.

In FIG. 5b, the second use case shows a scenario wherein the load and DER 28 (e.g., an appliance, thermostat, or the like), having DR logic 21, may interact directly with the DRMS 24 via gateway 35 to receive the DR signal 13. In FIG. 5c, as noted herein, the DRMS 24 may provide direct load commands 34 directly to load and DER 28. It may be that virtually all of the DR logic 21 concerning how to respond to a DR signal is embedded directly in a load controller.

There may be scenarios which are a combination of the first and second use cases in which some of the DR logic 21 is embedded within an EMCS 26 and some of the DR logic 21 is embedded within the load controller.

The present approach may deal with DR logic 21 that is instantiated within the DRMS 24. It may be assumed that the nature of the DR signals 13 which are being delivered by the DRMS 24 are of either a grid state or a DR resource instruction category. DR signals 13 may conform to an existing standard or specification such as the OpenADR.

Figure 6:
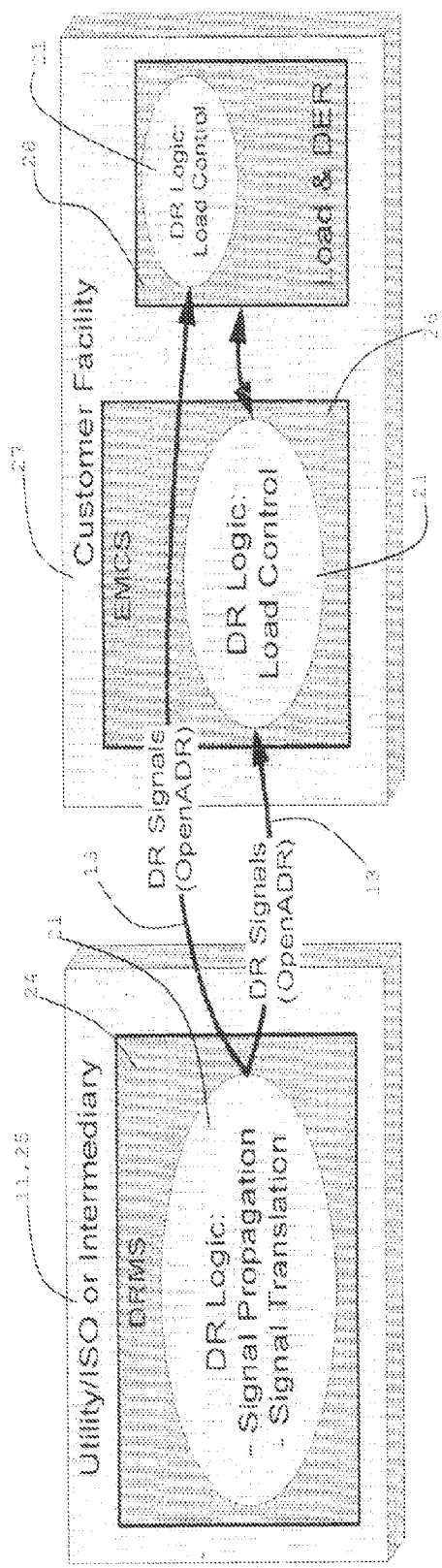
FIG. 6 is a diagram showing a consolidated scenario in which demand response signals generated by a demand response management system may be delivered to either an energy management control system or directly to a load control mechanism within a customer's facility.

In FIG. 6, a diagram shows a consolidated scenario in which DR signals 13 generated by the DRMS 24 may be delivered to either an EMCS 26 or directly to a load controller within the customer's facility 27.

Main functions of DR logic 21 within the DRMS 24 of utility/ISO 11 or intermediary 25 may incorporate 1) DR signal 13 propagation and 2) DR signal 13 translation (generation). A notion of a DR event 31 (FIG. 7) may be further defined. A DR event may be initiated by the utility/ISO 11 or intermediary 25 which is responsible for ultimately generating a DR signal 13 for the customer 12 or customer facility 27. A main function of DR logic 21 may be to take a DR event 31 and generate an appropriate DR signal 13.

A DR event 31 may have several attributes. One attribute may be a schedule for the various periods which is associated with the DR event. Two very significant periods may be 1) the so-called notification period before an event and 2) the period when the event itself is active. Another attribute may be a set of information or instructions which is associated with the DR event. This information may be particularly specific to a DR program and be a main instrument that the utility/ISO 11 uses to interact with the customer 12 during DR events. Examples of information or instructions may incorporate prices, shed levels and device commands. This information may fall into one of the three categories of supply state 16, DR resource instructions 17 and load controller commands 18, as indicated in FIG. 3.

DR Signal 13 propagation of DR logic 21 within DRMS 24, may be noted. One of the functions of the DR logic 21 may be to take a DR event and a specification as to which DR resources (customers) 12 are to receive signals, and from that determine an appropriate set of customers and their devices that need to receive DR signals 13. This may be referred to as propagating the DR signal 13.

Figure 7:
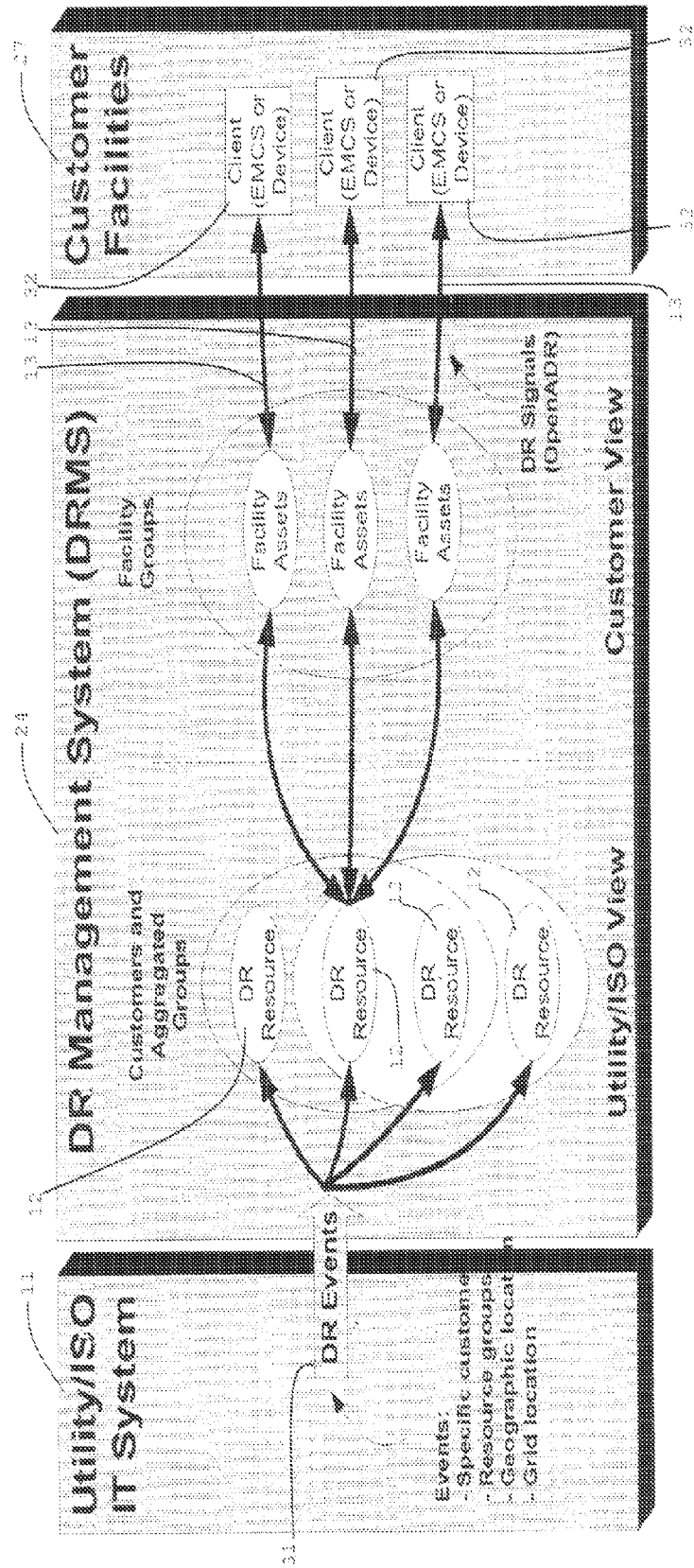
FIG. 7 is a diagram of where one or more demand response resources may be an entity that have a relationship with a utility and/or independent service operator or and intermediary relative to being a participant in a demand response event.

In a diagram of FIG. 7, a DR resource 12 may be an entity (typically a customer or participant) that has a relationship with the utility/ISO 11 or intermediary 25 and represents the entity that the utility/ISO 11 or intermediary 25 interacts with. This means that if the utility/ISO 11 wants to issue a DR event 31, then the DR resources 12 may be the entities that utility/ISO 11 calls upon to participate in the event 31.

DR resource 12 management and signal propagation may be noted. Each customer (i.e., DR resource 12) may manage a set of so-called clients 32 (EMCS or device) that it uses to manage its interactions with the DRMS 24. It may be the clients 32 that receive DR signals 13 from the DRMS 24. Thus, as shown in FIG. 7, each DR resource 12 may have associated with it multiple clients 32. Each of the clients may receive its own version of a DR signal 13 corresponding to a DR event 31.

Each DR resource 12 and set of associated clients 32 may have a set of attributes such as customer name, geographic location and grid location. Furthermore, DR resources 12 and clients 32 may be associated with groups that can be used for aggregation purposes. When a DR event 31 is issued by the utility/ISO 11, there may be additional data that specify who is to receive the DR signals 13. As recipients of DR signals 13, the data may indicate specific customers, aggregated group identifiers, resource groups, geographic regions and/or locations, and/or grid locations. These data or specifications may be used by the DRMS 24 to determine which DR resources 12 and which clients 32 of the DR resources 12 are to receive the DR signals 13.

Participation rules may be noted for DR signal 13 propagation. In addition to the attributes, each DR resource 12 may have associated with it a set of business rules that dictate the schedule constraints of when the DR resource 12 will participate in DR events 31. Such rules may incorporate: 1) Blackout periods having specific date/time periods, time of day, days of week, and/or days of month; 2) A maximum number of events for a year, month, week, and/or consecutive days; 3) Maximum and minimum durations of events; and/or 4) Maximum and minimum notification times for upcoming events.

If an event is issued that violates any of the constraints or rules, then the DRMS 24 may be configured such that it will not propagate a DR signal 13 to the DR resource 12 or its clients 32. Thus, the constraints or rules may also be a mechanism to control how DR signals 13 are propagated to the clients 32 of DR resources 12.

DR signal 13 generation (translation) of DR logic 21 within DRMS 24 may be noted. One of the functions of DR logic 21 may be to translate whatever information is associated with a DR event 31 into an appropriate DR signal 13 that can be sent to the customer or resource 12. In some cases, there may be very little, if any, translation or transformation necessary, but in some cases the DR event 31 information (e.g., prices, shed levels, and so forth) may be translated into a form that is specific for the customer 12.

The following are general transformations (or translations) that may take place to generate a DR signal 13. One may be to customize the DR event 31 schedule for the customer 12. A second transformation may be to customize the DR event 31 information specifically for the customer 12. For example, a particular DR program may use prices as the main instrument in a DR signal 13, but each individual customer 12 may receive a different price based upon a bid that the customer has placed. Thus, the price within the DR signal 13 may be customized for each customer 12.

A third transformation may be to translate the information in the DR event 31 to an alternate form which makes it easier for the customer's automation equipment to consume it. Examples of transformations of this type may include the simple DRAS (demand response automation server) client signal levels that are described in the OpenADR (open automated demand response (communications specification)). The simple levels in OpenADR may be specifically designed to allow more complex information such as prices and shed amounts to be translated into one of a finite set of simple levels such as NORMAL, MODERATE, and HIGH. These simple levels may then be more easily translated into specific load control commands using DR logic 21 within the customer's facility 27.

A fourth transformation may be to use feedback from the customer 12 (e.g., real-time usage information) to modify the DR event 31 and associated signal information. A fifth transformation may be to translate the information in a DR event 31 into actual load control commands, e.g., direct load control commands 34 of FIG. 5c. The fifth transformation may be described in U.S. patent application Ser. No. 12/834,841, filed Jul. 12, 2010, and entitled "A System for Providing Demand Response Services", which is hereby incorporated by reference.

Figure 8:
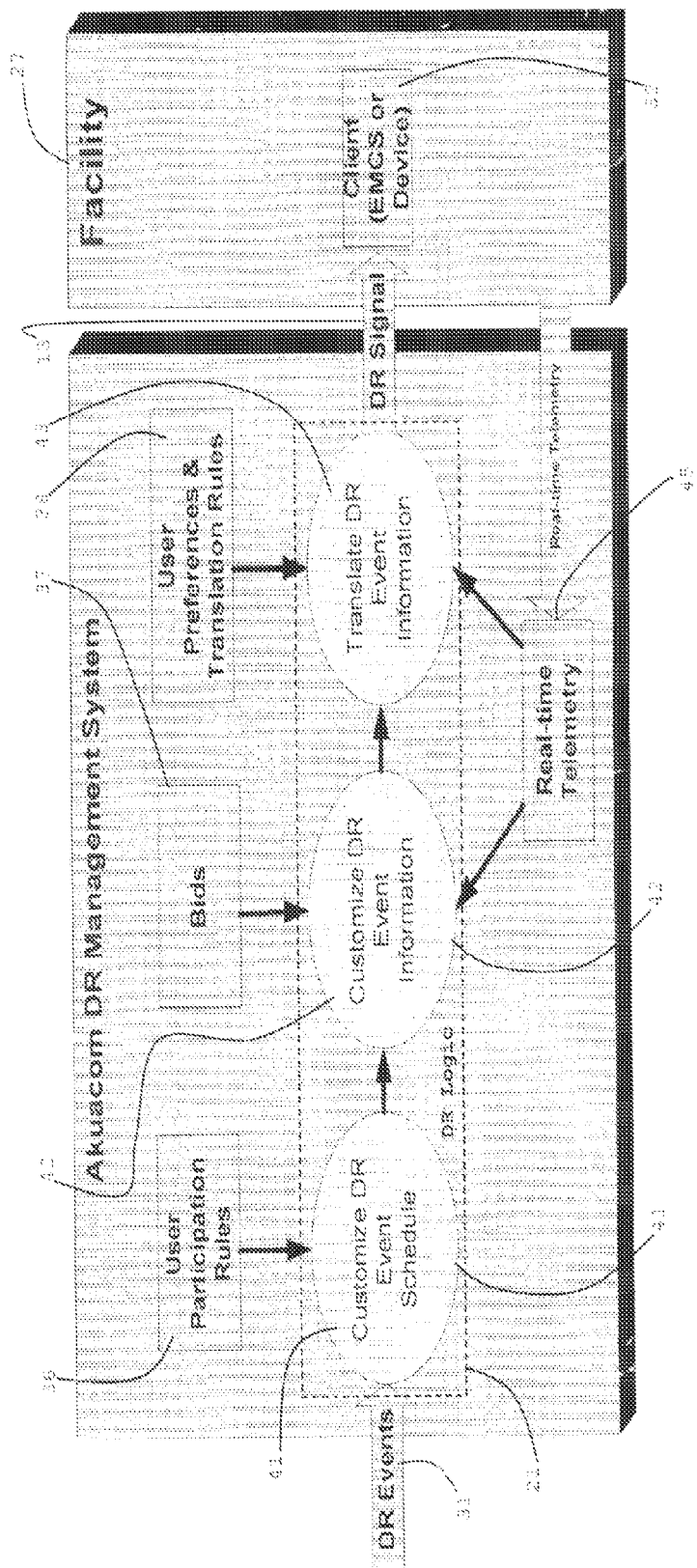
FIG. 8 is a diagram showing a demand response management system for generating a demand response signal, which may be adjusted, for a particular client, customer or participant, relative to a demand response event.

A diagram of FIG. 8 shows the DR signal 13 generation (translation) process of a DR management system. DR logic 21 (FIG. 6) and one of its main functions, DR signal generation, may be noted. The mechanism of the Figure described herein may allow for DR event 31 information to be translated, but it may also be possible to translate the timing parameters of the DR event 31 by using the participation rules indicated herein. If the rules defined for a particular customer 12 or participant, do not match the event 31 schedule, then it may be possible for the DRMS to be configured such that the DR signal 13 which is generated can be adjusted to match the business rules.

For example, one may assume that a participation rule has been defined for a particular participant, such as "Can participate in DR events from 3 pm to 6 pm." Now one may assume that a DR event 31 is issued with a schedule, such as "Event active from 4 pm to 7 pm." Since there is a period of the DR event 31 in which the participant has specified that it will not participate, it may be possible for the DRMS to be configured to generate a DR signal 13 that spans from 4 pm to 6 pm in order to match the participant's rule, by eliminating the 6 pm to 7 pm period in which the participant cannot participate. This way, the participant may be present for the whole schedule of event 31. Likewise, the DRMS may also have been configured to reject the DR event 31 and generate no DR signal 13 for that participant in accordance with the signal propagation rules as described herein.

Implementation of DR logic 21 for signal generation, that of another main function of the DR logic 21 (FIG. 6) may be noted. A portion or more of DR logic 21 being used to generate DR signals 13 may be described in several steps as shown FIG. 8. A first step 41 may entail customizing or modifying the schedule of the DR event 31 to match user participation rules 36 of the DR resource 12. A second step 42 may entail customizing or modifying DR event 31 information in view of bids 37. Bids may be just one example of information or variable. One or more of other items, such as shed levels, prices, demands, usage, and so forth, may be used apart from bids 37 or in combination with bids. A third step 43 may entail translating DR event 31 information in view of user preferences and translation rules 38.

The second step 42 and the third step 43 may entail actually modifying the information that is encapsulated within DR signal 13. Steps 41, 42 and 43 may be modeled as a set of Boolean equations which relate the following quantities: 1) Start time may be when the condition first becomes valid; 2) End time may be an end of when the condition is valid; 3) Variable may be either an input variable associated with the event 31 (e.g., price, shed level, bid, usage, and/or so forth), or it may be a telemetry variable that is fed back via real-time telemetry 45 to steps 42 and/or 43 from a client or customer's facility 27 synch as a usage or device state (for instance, the variables may typically be fixed and set by the definition of the DR program); 4) Condition may be logical Boolean operation that relates the one or more variables to some user defined value or values (for instance, this may be a typical sort of Boolean operations such as greater than, less than, equal, and so forth); and 5) Operations may be what is to be done if the rule is TRUE.

One way of representing these quantities or rules in a way that allows them to be easily edited by users may be in the form of an example table 40 as shown in FIG. 9. Table 40 may consist of a collection of rules. The top row may list headings indicating a rule, start time, end time, variable, condition, value, "operation 1: set simple level" and "operation 2: set price". Table 40 shows just one instance of a set of rules as these rules may be edited or there could be other rules which are different in type, kind, and/or number. Each rule number (for instance, 1, 2, 3 or 4) may represent a set of conditions, such as start time, end time, variable, condition, and value, in that when AND'd together they result in a TRUE, which will execute the specified operation, such as an operation 1 of setting a simple level or an operation 2 of setting a price, as for instance in the example of table 40.

In table 40, there may be multiple types of operations other than those shown as examples, which can be executed, and rules, with conditions which are related to a particular operation, that may be logically grouped together so that the first rule, which relates to a particular operation, that is TRUE in terms of its conditions, is the rule which applies. In the example table, the conditions are "AND'd"; however, there may be rules where the conditions are logically "OR'd" in determining if rule is true for purpose of implementing a designated operation. The conditions may be connected in a combination of being logically "AND'd" and "OR'd" a truth determination of the respective rule and or the operation to be effected.

In rule one of table 40, for example, the price level may be set to the "BID" level and thus this may be a representation of how a price level for a DR event 31 may be customized for a particular client 32. In an actual deployment, this type of operation may probably be fixed by default by the business rules of the DR program and would not necessarily appear as an editable table to the user.

In rules 2-4 of table 40, the operation may be set to the simple level of the DR signal 13. This simplification may represent a type of signal translation in which the information associated with the DR event 31 (e.g., price) can be converted into a simpler representation. This does not necessarily imply that the price information is not also sent with the DR signals 13, but it may mean that an alternate form (i.e., simple level) is also sent. This may give a great deal of flexibility to the client 32 in how it consumes the information and is supported by DR signal's specifications such as OpenADR.

There may be separate collections of rules for each client 32 and a DR program that client 32 is participating in. The nature of the DR program may define the variables that are associated with the program. For example, one program might use price while another might use shed level. Furthermore, feedback variables may be used in the rules as a way to modify the DR signals 13 in real time during the DR event 31 as could be shown as an instance in rule three.

The items in table 40 noted herein may be effected with a computer. Table 40 may be meant to allow for easy modification by end users and be just one representation of a set of rules that could be applied to converting a DR event 31 to a DR signal 13. There may be other representations. There may be other ways of specifying the rules which relate the various variables and user specified conditions to values that appear in DR signal 13. Sets of rules may be created using free form equations that are interpreted, or even some sort of programming language such as Java may be used.

To recap, a demand response management processing system may incorporate a demand response (DR) server and one or more DR resources connected to the DR server. The DR server may have a controller and a graphic processing unit (GPU) connected to the controller. The GPU may have a plurality of central processing units (CPUs). The one or more DR resources may have components which are processed by two or more CPUs of the plurality of the CPUs, respectively.

The system may further incorporate a component having DR logic. DR logic for each of the one or more DR resources may be processed by a CPU of the plurality of CPUs. The plurality of CPUs may operate in parallel. The DR logic may incorporate a set of rules for the respective DR resource, which defines content of signal values to the controller and the DR signals from the controller to the respective DR resource. A CPU of the plurality of CPUs may process information and DR logic of a DR resource into signal values for DR signals to the DR resource. Another CPU of the plurality of CPUs may process information and DR logic of another DR resource into signal values for DR signals to the other DR resource, and so on.

Processing DR logic of a DR resource into signal values for DR signals to each DR resource may be an operation. Each operation assigned to a CPU of the plurality of CPUs may be a thread execution. A plurality of operations assigned to a plurality of CPUs, respectively, incorporate parallel execution threads.

An approach for managing rules for demand response resources, may incorporate receiving resource information from one or more demand response (DR) resources, processing the resource information into a configuration and inputs for rules, with a main central processing unit, and processing the configuration and inputs for rules in conjunction with a set of rules for each DR resource into signal values with two or more central processing units of a plurality of central processing units of a graphic processing unit. The two or more central processing units may operate in parallel.

The approach may further incorporate converting the signal values for each DR resource into DR signals at the main central processing unit for conveyance to the respective DR resource of the one or more DR resources.

The processing of the configuration and inputs for rules into signal values may be an operation. An operation assigned to a central processing unit of the graphic processing unit may be an execution thread. Two or more operations assigned to two or more central processing units of the graphic processing unit, respectively, may be two or more execution threads. The two or more execution threads may be performed by the two or more central processing units of the graphic processing unit. The two or more execution threads may constitute a thread block. The thread block may be a set of concurrent execution threads.

DR resource rules which define content of the DR signals conveyed respectively to the one or more DR resources may be at least a part of DR logic for the one or more DR resources. The DR logic for the one or more DR resources may be processed to obtain signal values for the DR signals by the two or more central processing units of the graphic processing unit.

A demand response management processing system may incorporate a demand response (DR) server, and two or more DR resources connected to the DR server. The DR server may have a graphic processing unit connected to the main central processing unit. The graphic processing unit may have two or more cores. A core of the two or more cores may execute a set of rules for a respective DR resource of the two or more DR resources.

Each core may incorporate a central processing unit and a memory connected to the central processing unit. The DR server may further incorporate a main central processing unit and memory, connected to the two or more DR resources and the graphic processing unit. Each of the two or more DR resources may have an information connection to the main central processing unit and memory, and a DR signal connection from the main central processing unit and memory. The main central processing unit and memory may have a configuration and inputs for rules connection to the graphic processing unit, and a signal values connection from the graphic processing unit.

The two or more cores may correspond to the two or more DR resources, respectively. A memory connected to the central processing unit of a core may contain the set of rules for the DR resource of the two or more DR resources, corresponding to the core incorporating the memory.

The central processing unit of a core may process the configuration and inputs for rules in conjunction with the set of rules to obtain signal values. The signal values may be processed by the main central processing unit into DR signals for the respective DR resource. The set of rules may incorporate DR logic.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A demand response management processing system for a utility provider or an intermediary of a utility provider, the system comprising:
a demand response (DR) server of a utility provider or an intermediary of a utility provider;
one or more DR resources connected to the DR server, wherein the one or more DR resources are from a customer of the utility provider; and
wherein:
the DR server comprises:
a controller; and
an individual graphic processing unit (GPU) connected to the controller; and
wherein the individual GPU comprises a plurality of central processing units (CPUs) on a single chip;
the one or more DR resources have components which are processed by two or more CPUs of the plurality of the CPUs, respectively, where a component comprises DR logic and DR logic for each of the one or more DR resources is processed by a CPU of the plurality of CPUs;
processing DR logic of a DR resource into signal values for DR signals to each DR resource is an operation;
each operation assigned to a CPU of the plurality of CPUs is a thread execution; and
a plurality of operations assigned to a plurality of CPUs, respectively, comprise parallel execution threads.

2. The system of claim 1, wherein the plurality of CPUs operate in parallel.

3. The system of claim 2, wherein the DR logic comprises a set of rules for the respective DR resource, which defines content of signal values to the controller and the DR signals from the controller to the respective DR resource.

4. The system of claim 2, wherein:
a CPU of the plurality of CPUs processes information and DR logic of a DR resource into signal values for DR signals to the DR resource; and
another CPU of the plurality of CPUs processes information and DR logic of another DR resource into signal values for DR signals to the other DR resource, and so on.

5. A method for managing rules for demand response resources of customers of a utility provider, comprising:
receiving at a utility provider or an intermediary of a utility provider resource information from one or more demand response (DR) resources of one or more customers of a utility provider;
processing the resource information into a configuration and inputs for rules, with a main central processing unit; and
processing the configuration and inputs for rules in conjunction with a set of rules for each DR resource into signal values with two or more central processing units of a plurality of central processing units of an individual graphic processing unit; and
wherein:
the two or more central processing units of the individual graphic processing unit operate in parallel;
the processing of the configuration and inputs for rules into signal values is an operation;
an operation assigned to a central processing unit of the graphic processing unit is an execution thread;
two or more operations assigned to two or more central processing units of the individual graphic processing unit, respectively, are two or more execution threads; and
the two or more execution threads are performed by the two or more central processing units of the individual graphic processing unit.

6. The method of claim 5, further comprising converting the signal values for each DR resource into DR signals at the main central processing unit for conveyance to the respective DR resource of the one or more DR resources.

7. The method of claim 5, wherein:
the two or more execution threads constitute a thread block; and
the thread block is a set of concurrent execution threads.

8. The method of claim 5, wherein DR resource rules which define content of the DR signals conveyed respectively to the one or more DR resources are at least a part of DR logic for the one or more DR resources.

9. The method of claim 8, wherein the DR logic for the one or more DR resources is processed to obtain signal values for the DR signals by the two or more central processing units of the individual graphic processing unit.

10. A demand response management processing system of a utility provider or an intermediary of a utility provider comprising:
- a demand response (DR) server of a utility provider or an intermediary of a utility provider, the DR server comprising a main central processing unit and memory; and
- two or more DR resources connected to the main central processing unit and the memory of the DR server, wherein the two or more DR resources are from a customer of the utility provider; and wherein:
- the DR server comprises an individual graphic processing unit connected to the main central processing unit and the memory;
- the main central processing unit and memory have a configuration and inputs for rules connection to the graphic processing unit, and a signal values connection from the individual graphic processing unit;
- each of the two or more DR resources have an information connection to the main central processing unit and memory, and a DR signal connection from the main central processing unit and memory;
- the individual graphic processing unit comprises two or more cores, wherein each core includes a central processing unit and a memory connected to the central processing unit;
- the two or more cores correspond to the two or more DR resources, respectively; and
- a memory connected to the central processing unit of a core contains a set of rules for the DR resource of the two or more DR resources, corresponding to the core comprising the memory;
- a core of the two or more cores executes the set of rules for a respective DR resource of the two or more DR resources;
- the central processing unit of a core processes the configuration and inputs for rules in conjunction with the set of rules to obtain signal values; and
- the signal values are processed by the main central processing unit into DR signals for the respective DR resource.

11. The system of claim 10, wherein the set of rules comprises DR logic.

* * * * *